US007343606B2

(12) United States Patent
Schechter et al.

(10) Patent No.: US 7,343,606 B2
(45) Date of Patent: Mar. 11, 2008

(54) MECHANISM FOR ASYNCHRONOUS COMPONENTS TO BE APPLICATION FRAMEWORK AGNOSTIC

(75) Inventors: Greg D. Schechter, Seattle, WA (US); Yann Erik Christensen, Seattle, WA (US); Michael J. Marucheck, Bellevue, WA (US); Dmitry Robsman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 607 days.

(21) Appl. No.: 10/461,195

(22) Filed: Jun. 13, 2003

(65) Prior Publication Data

US 2004/0255300 A1    Dec. 16, 2004

(51) Int. Cl.
*G06F 9/46* (2006.01)
*G06F 13/00* (2006.01)

(52) U.S. Cl. ...................... 719/318; 719/314
(58) Field of Classification Search ............... 719/313, 719/314, 318
See application file for complete search history.

(56) References Cited

U.S. PATENT DOCUMENTS

| 6,088,511 A * | 7/2000 | Hardwick ................ 717/149 |
| 6,970,903 B1 * | 11/2005 | Toivonen ................ 709/203 |
| 2002/0004850 A1 * | 1/2002 | Sudarshan et al. ......... 709/313 |
| 2002/0046303 A1 * | 4/2002 | Honishi et al. ............ 709/330 |
| 2002/0095656 A1 * | 7/2002 | Clark et al. ............... 717/107 |

FOREIGN PATENT DOCUMENTS

| EP | 1241593 A2 | 3/2002 |
| WO | 96/08765 A1 | 3/1996 |

OTHER PUBLICATIONS

Scott Oaks and Henry Wong. "Java Threads, 2nd Edition". O'Reilly Publishing, Jan. 1999.*
Scott Oaks and Henry Wong. Java Threads, 2nd Edition. O'Reilly & Associates, Inc., 1999.*
Gamma, Erich, Design Patterns: Elements of Reusable Object-Oriented Software,Library of Congress Cataloging-in-Publication Data, Copyright 1995 by Addison Wesley Longman, Inc., 36 pages, printed in the USA and published simultaneously in Canada.
Stiefel, Michael and Robert J. Oberg, Application development using C# and .NET, Expert Practitioners Seasoned Instructors, Copyright 2002 by Michael Stiefel and Robert J. Oberg, 48 pages, Published by Prentice hall PTR, Prentice-Hall, Inc., Upper Saddle River, New Jersey 07458.

* cited by examiner

*Primary Examiner*—William Thompson
*Assistant Examiner*—Richard Pantoliano, Jr.
(74) *Attorney, Agent, or Firm*—Workman Nydegger

(57) ABSTRACT

An application is built in accordance with a particular application framework. A component is incorporated into the application. When an asynchronous operation is to be performed, the component is configured to issue a standard function call in a manner that is independent of the particular application framework used to build the application. An asynchronous operations manager is configured to detect the particular application framework used to build the application, receive the standard function call, perform the asynchronous operation in accordance with a threading and concurrency model of the application framework, and cause a notification to be issued to the component in a manner that is in accordance with the threading and concurrency model when the asynchronous operation is complete. The asynchronous operations manager may determine the application framework by receiving a notification or function call from the application framework itself.

20 Claims, 3 Drawing Sheets

MECHANISM FOR ASYNCHRONOUS COMPONENTS TO BE APPLICATION FRAMEWORK AGNOSTIC

BACKGROUND OF THE INVENTION

1. The Field of the Invention

The present invention relates to software development technology. More specifically, the present invention relates to mechanisms in which an asynchronous operations manager provides a standardized interface to an asynchronous component such that the asynchronous component interfaces in the same way with the asynchronous operations manager regardless of the specific application framework used to build the application into which the asynchronous component is incorporated.

2. Background and Related Art

Computing technology has transformed the way we work and play. Computing technology relies on sophisticated hardware including interconnected processing, memory, communication and user interface devices. Software governs how these various physical components interact with each other and with a user in order to enable a substantially unlimited variety of applications.

Software is created by human programmers most often using source code. Source code includes language and symbols that are relatively intuitive to a human programmer. However, source code is not directly interpretable by a processor. Accordingly, in order to obtain functioning software, the source code is interpreted or compiled into binary instructions and data that may directly instruct the processor on what specific actions are to be performed in order to enable the functionality of the software.

Software is becoming more and more complex as time progresses. It is not at all unusual for an application to contain many thousands, and even millions of distinct binary instructions. This rapid advancement in software development is enabled largely by the fact that once a component is built that performs a particular lower level task, that component may be incorporated into many different applications that are to perform that lower level task, even if the higher level functionality of the applications are quite different. A component is a discrete set of computer-executable instructions that, when executed, implement one or more functions. The component may be called by other software components or applications. Object oriented programming enables this. Accordingly, an application programmer has access to often a wide variety of components that it may incorporate into the application by placing a function call that properly interfaces with the component. Applications may incorporate many different components.

An application may be built using one of many widely-used application frameworks. Examples of application frameworks includes the WINDOWS Forms client-side User Interface (UI) programming framework, the ASP.NET server-side UI programming and HTTP framework, free threaded console applications, applications embedded into SQL Server and others. Conventionally, in order for a component to be available to applications that may have been written using one of multiple application frameworks, the component would typically either be specifically designed and written to work in applications following any of the multiple frameworks, or there would have to be a component corresponding to each one of the frameworks.

It is important that components take into consideration the specific application framework when performing asynchronous operations. An asynchronous operation is an operation that advances towards completion on another thread of execution or on some piece of hardware while other processes are ongoing. When the asynchronous operation is complete, an event notification occurs to execute code written in the context of and accordingly to the rules of the targeted application framework. However, the context and thread upon which the notification is returned depends heavily on the application framework used to build the application that incorporates the component. The component would thus be built in such a way that it is prepared to receive the notification when issued (and then send a corresponding notification to the application) in accordance with the particular threading and concurrency model used by the corresponding application framework. Otherwise, the asynchronous operation may fail.

Accordingly, for an asynchronous operation to work across multiple frameworks, a separate component is built for one of the application frameworks, a separate component is built for another of the application frameworks, and so forth for all of the application frameworks. Alternatively, the component may be built to work with any one of multiple application frameworks. However, in either case, the author of the component(s) would need to consider the threading and concurrency model of each of the application frameworks and address the threading and concurrency model issues through explicitly drafted source code.

Accordingly, what would be advantageous is a mechanism that allows a component to operate under a wide-variety of application frameworks without the author of the component having to consider application framework specific issues such as the threading and concurrency model. It would further be advantageous if the application was not curtailed in its use of components since certain components only work with certain application frameworks.

BRIEF SUMMARY OF THE INVENTION

The foregoing problems with the prior state of the art are overcome by the principles of the present invention in which an asynchronous operations manager permits components to perform asynchronous operations in a standardized fashion regardless of the application framework used to build the application that incorporates the component. This allows a single component to be more easily built while allowing that component to perform asynchronous operations regardless of which application framework was used to build the application.

In accordance with the principles of the present invention, an application is built in accordance with a particular application framework. A component is incorporated into the application. When an asynchronous operation is to be performed, the component is configured to issue a standard function call in a manner that is independent of the particular application framework used to build the application. An asynchronous operations manager is configured to detect the particular application framework used to build the application, receive the standard function call, perform the asynchronous operation in accordance with a threading and concurrency model of the application framework, and cause a notification to be issued to the component in a manner that is in accordance with the threading and concurrency model when the asynchronous operation is complete. The asynchronous operations manager may determine the application framework by receiving a notification or function call from the application framework itself.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
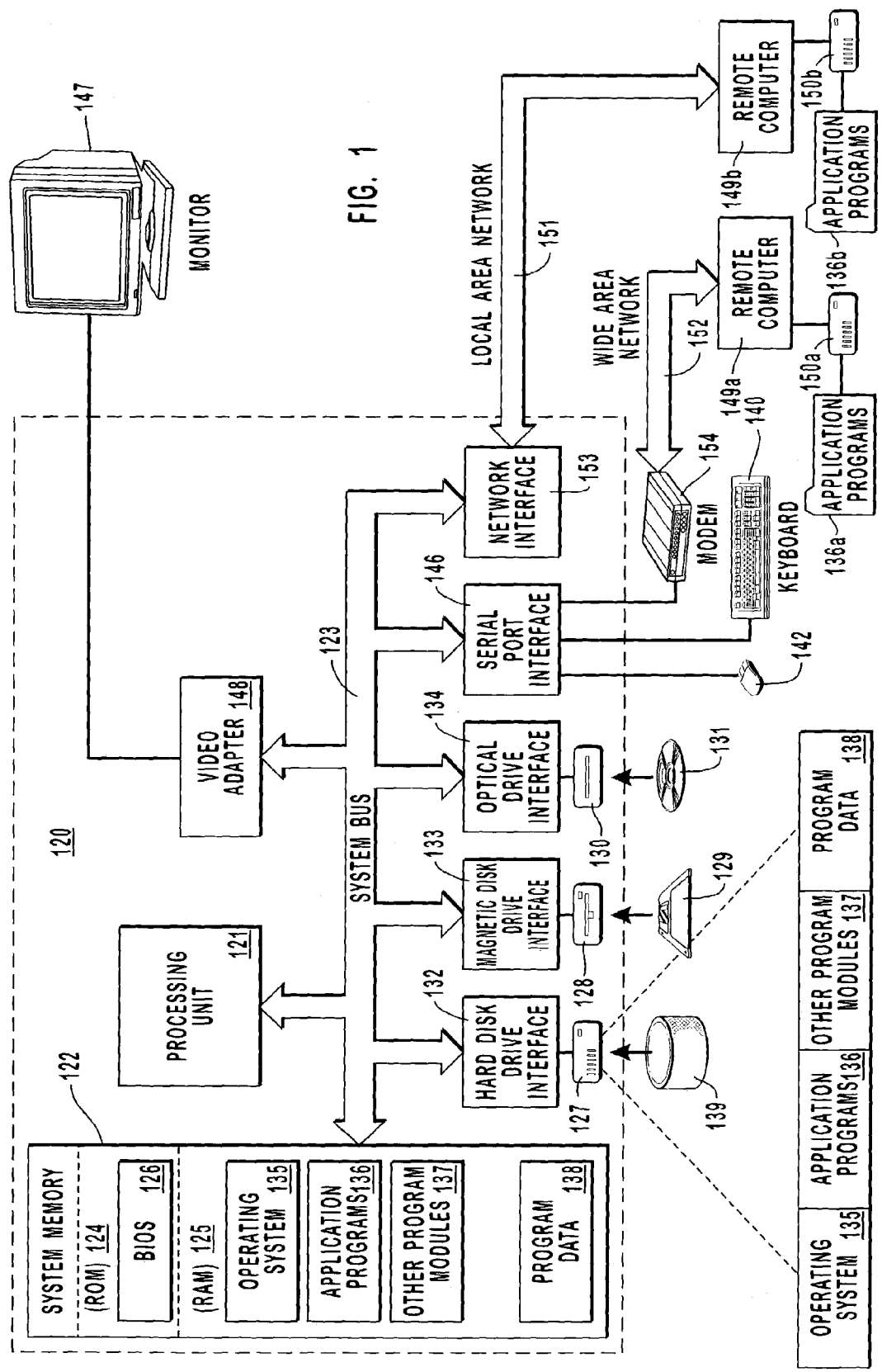
FIG. 1 illustrates a suitable computing system that may implement the features of the present invention.

The principles of the present invention relate to mechanisms in which an asynchronous operations manager permits components to perform asynchronous operations in a standardized fashion regardless of the application framework used to build the application that incorporates the component. This allows a single component to be more easily built while allowing that component to perform asynchronous operations regardless of which of multiple application frameworks was used to build the application.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates suitable computing environment in which the principles of the present invention may be employed in the form of a computer 120. The computer 120 includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 represents a suitable operating environment for the present invention, the principles of the present invention may be employed in any computing system that is capable of browsing to network sites. The computing system illustrated in FIG. 1 is illustrative only, and by no means represents even a small portion of the wide variety of environments in which the principles of the present invention may be implemented. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
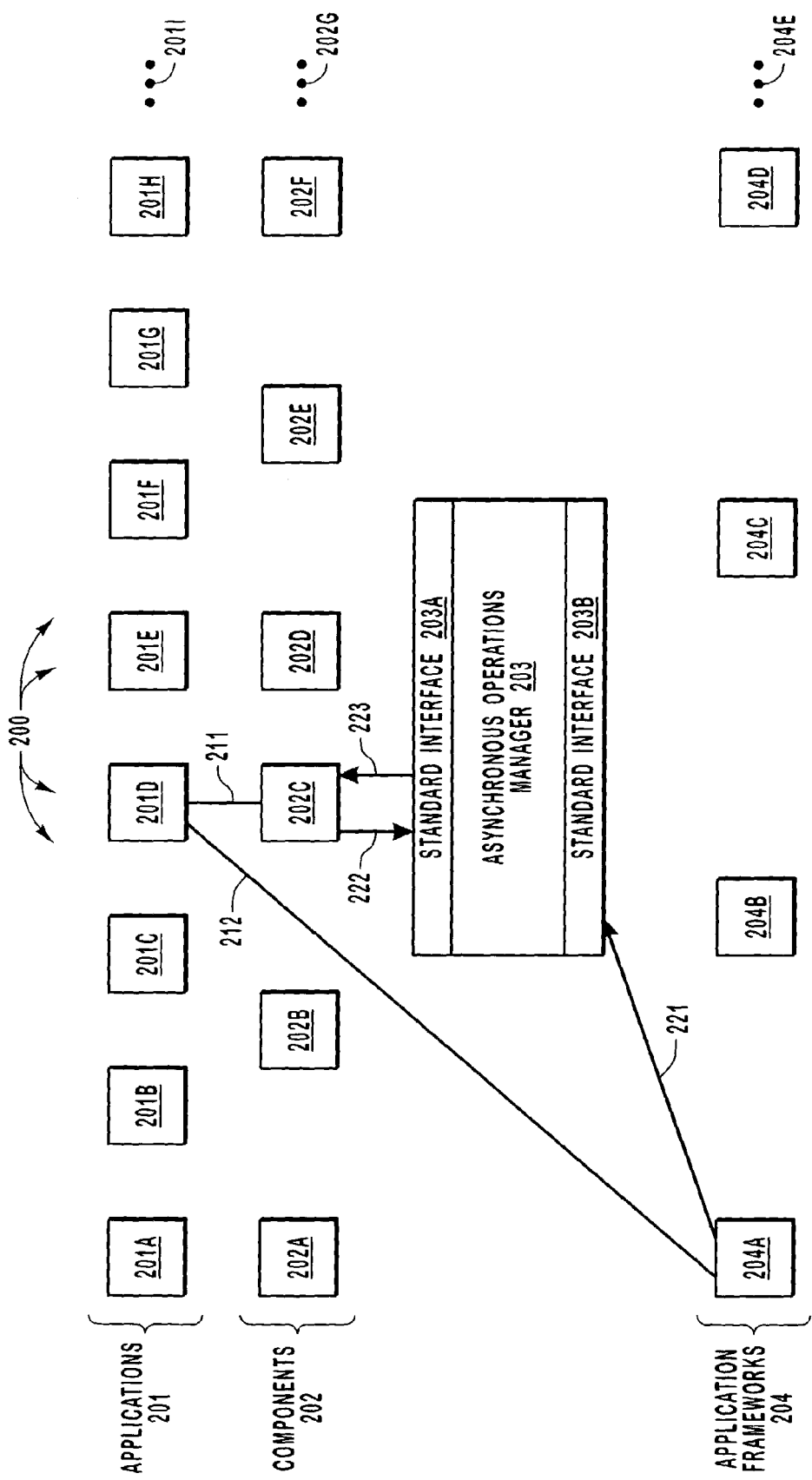
FIG. 2 illustrates an asynchronous operations manager that may facilitate asynchronous operations by receiving function calls from components that are incorporated into application built in accordance with application frameworks, and in which the asynchronous operations manager may communicate with multiple frameworks.

FIG. 2 illustrates a hierarchy 200 that assists in describing the principles of the present invention and that need not be on any one particular computing system. The hierarchy 200 includes a number of applications 201 including applications 201A through 201H among potentially many more as represented by the horizontal ellipses 201I. These applications represent software applications generally. A software application is typically created by having an author draft source code. Then, a compiler compiles (or an interpreter interprets) that source code into computer-executable instructions that may be read and followed by a processor.

One of the benefits of object oriented programming is that it allows for independently built components to be incorporated into an application. A component is a discrete set of computer-executable instructions that, when executed, implement one or more functions. The component may be called by other software components or applications. Since the independently built component may be incorporated into an application by a mere function call, the component need not be re-built each time an application is to have functionality offered by the component. Accordingly, object-oriented programming allows application authors to incorporate the work of others and thereby allow application authors to focus more attention on the more advanced features of the application, rather than getting bogged down in detailed operations that have already been addressed by others. Instead of redesigning and rebuilding the component, the application author need only draft sufficient code so that the application places an appropriately structured function call to the component, and so that the application may properly interpret a function call received from the component. Component designers typically document their specifications for placing and receiving function calls to allow application designers to do this.

Returning back to FIG. 2, the hierarchy includes a number of components 202 including components 202A through 202F among potentially many more as represented by the horizontal ellipses 202G. These components 202 represent components that may be built to allow incorporation into the application through a component creation mechanism followed by repeated function call and return mechanisms.

The applications 201 may be built using one of several available application frameworks 204. The application frameworks include applications frameworks 204A through 204D among potentially more as represented by the horizontal ellipses 204E. The application framework provides an environment and a set of tools which facilitates the building of a properly functional software application. Examples of application frameworks include the WINDOWS Forms client-side User Interface (UI) programming framework, ASP-.NET server-side UI programming and HTTP framework, free threaded console applications, applications embedded into SQL Server, and others that are now developed or may be developed in the future. Application frameworks are also often referred to in the art as "application models".

There are relatively few conventionally available application frameworks as compared to conventionally available components, and relatively few conventionally available components as compared to conventionally available applications. In FIG. 2, more applications 201 are shown than components 202, and more components 202 are shown than application frameworks 204 in order to illustrate this phenomenon, although the applications 201, components 202, and application frameworks 204 are by no means conventional.

The hierarchy 200 also includes an asynchronous operations manager 203. As previously mentioned, different application frameworks have different threading and concurrency models when it comes to asynchronous operations. An asynchronous operation is an operation that advances towards completion on another thread of execution or on some piece of hardware while application-level processes are ongoing. Some application frameworks have no restriction on what thread an asynchronous operation may execute on when complete. Others may require the asynchronous operation execute on a specific thread such as the same thread that is used to render the user interface. Others may require execute on a thread other than the thread used to render the user interface. Others may request the asynchronous operation execute on the same thread used to initiate the asynchronous operation. Yet others may have no requirement for returning on any particular thread, but require that operations be "serialized"; that is, no more than one operation proceeds at any given time.

Conventionally, when building a component that performs an asynchronous operation that is more desirable to perform in the background (such as a file download or the like), the component itself needed to contain code that expressly dealt with the threading and concurrency model of the application framework used to build the application into which the component may potentially be incorporated. Accordingly, significant effort is expended to draft such code, especially if the component may potentially be incorporated into applications that are built using one of multiple application frameworks. Even worse, multiple components may have been built to address different frameworks. Further, even components that are written for every existing application framework will typically fail to work in a newly introduced application framework.

The asynchronous operations manager 203 interfaces using standard interface 203A with the components 202 such that the components need not expressly address which application framework is being used. Instead, the component merely places a standard function call to the asynchronous operations manager using the standard interface 203A. Also, the application frameworks 204 may communicate with the asynchronous operations manager 203 using the standard interface 203B.

As previously mentioned, the hierarchy 200 need not be implemented on the same computing system. However, lines 211, 212 and arrows 221, 222 and 223 illustrate in interconnected relationship between application 201 D, component 202C, asynchronous operations manager 203 and application framework 204A. For purposes of illustrating the principles of the present invention, it will be assumed throughout the remainder of this description that application 201D, component 202C, asynchronous operations manager 203 and application framework 204A are operating on the same computing system and thus may be instantiated in system memory. An example of such a computing system is illustrated as computer 120 in FIG. 1 although any computing system will suffice.

The application 201 D was built using an application framework 204A as represented by interconnection line 212. The component 202C is incorporated into the application 201 D as represented by interconnection line 211. After the component 202C is created, the component 202C places a standard function call 222 to the asynchronous operations manager 203 via the standard interface 203A in order to initiate an asynchronous operation. The application framework 204A or another module may notify the asynchronous component (as represented by arrow 221) of the identity of the application framework used to build the application 201D into which the component 202C requesting the asynchronous operation is incorporated. Upon completion of the asynchronous operation, the asynchronous operations manager 203 notifies the component 202C of the asynchronous operation completion as represented by arrow 223.

Figure 3:
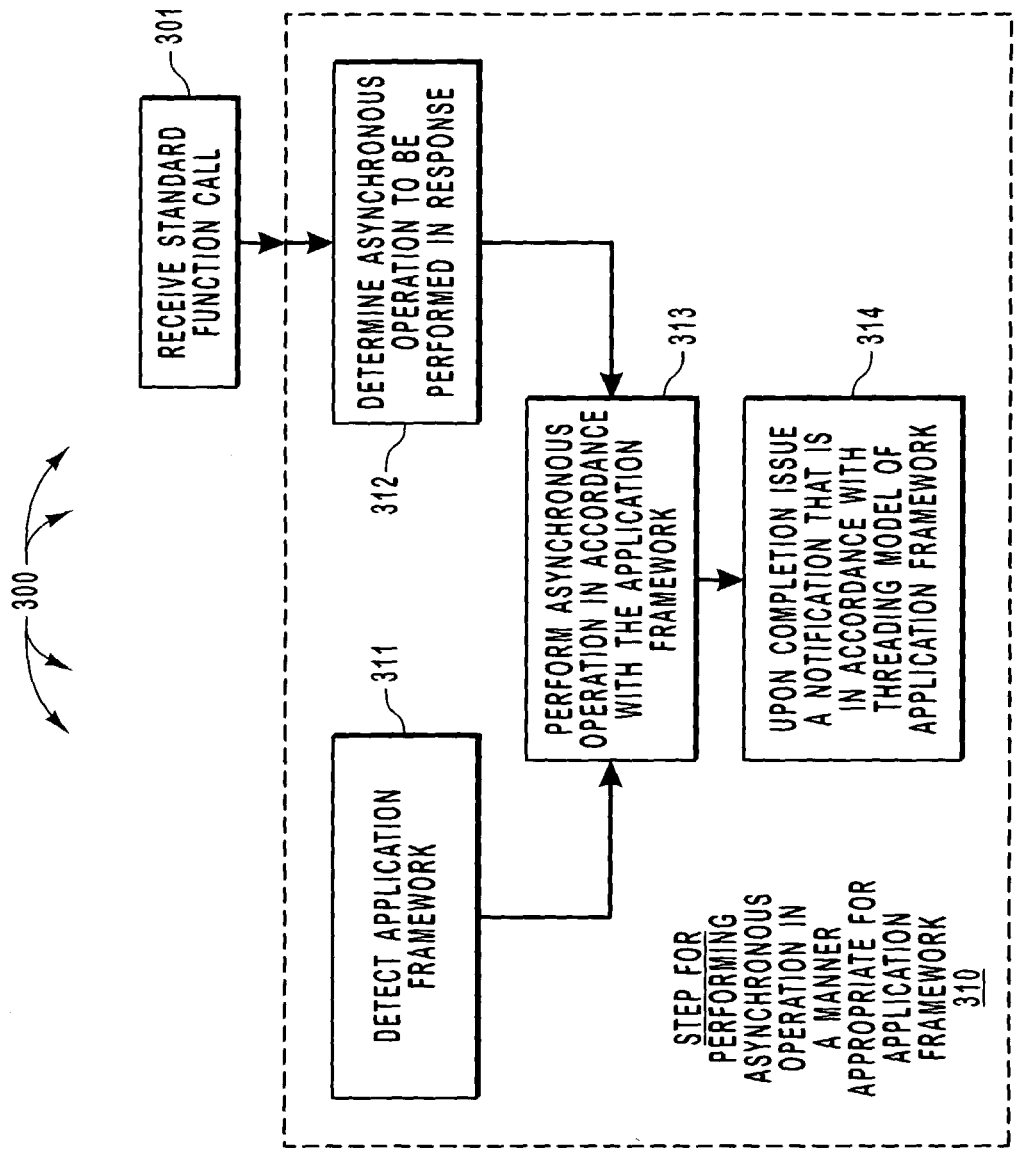
FIG. 3 illustrates a method for the asynchronous operations manager to facilitate asynchronous operations in accordance with the principles of the present invention.

FIG. 3 illustrates a method 300 for at least one of the components performing asynchronous operations in a manner that is independent of the application framework used to build the application into which the component is incorporated. In the context of FIG. 2, the component performing the asynchronous operation is the component 202C whereas the application that incorporates the component is the application 201D.

The method 300 is implemented by the asynchronous operations manager 203. The asynchronous operation manager receives the standard function call 222 from the component 202C (act 301), and then performs a functional, result-oriented step for performing an asynchronous operation in a manner appropriate for the application framework in response to the standard function call, even though the standard function call was issued in a manner that is independent of the application framework (step 310). The step may include any corresponding acts for accomplishing this result. However, in the illustrated embodiment, the step 210 includes corresponding non-functional acts 211, 212, 213 and 214.

Specifically, the asynchronous operations manager 203 detects the application framework 204A used to build the application 201D into which the component 202C is incorporated (act 311). This may be accomplished by receiving the notification 221 that identifies the application framework 204A. This act may occur at anytime before or during the execution of the asynchronous operation.

The asynchronous operations manager 203 further determines that an asynchronous operation is to be performed in response to the function call (act 312). The asynchronous operations manager 203 then performs the asynchronous operation in accordance with the application framework 201D used to build the application into which the component 202C is incorporated (act 313). Then, the asynchronous component issues a notification 223 to the component 202C in a manner that is in accordance with the threading and concurrency model when the asynchronous operation is complete (act 314). In other words, the asynchronous operation returns on a thread that is appropriate for the detected application framework. Depending on the threading and concurrency model, this may involve returning on any thread without restriction, returning on the same or a different thread than that used to render the user interface, returning on the same thread used to initiate the asynchronous operation, or the like.

Having described the principles of the present invention, an example of a component that may interface with the asynchronous operations manager 203 will now be described with respect to a code example. The example component contains several methods that are usable for any application framework that the asynchronous operations manager 203 may handle. A code example of an asynchronous operations manager will also be provided further below.

The component code example below is entitled "WholesaleGeoduckPricer" and illustrates the component's use of the asynchronous operations manager 203 which is referred to in the code example as "AsyncOperationManager". The elements in bold are particularly relevant to AsyncOperationManager. Note first that the version of CalculatePriceAsync( ) implemented here takes a state object called "state". Furthermore, the WholesaleGeoduckPricer" allows multiple simultaneous operations to be outstanding. The AsyncOperationManager and related classes make managing the implementation of these multiple simultaneous operations straightforward from the viewpoint of the component author.

The component code example is presented as follows with line numbering added for clarity.

```
1.  using System.ComponentModel;
2.  public class WholesaleGeoduckPricer : Component
3.  {
4.      public WholesaleGeoduckPricer( )
5.      {
6.          onCompletedDelegate = new AsyncOperationPostDelegate(CalculateCompleted);
7.      }
8.      public void CalculatePriceAsync(float kilos, object state)
9.      {
10.         AsyncOperation asyncOp = AsyncOperationManager.CreateOperation(state);
11.         someMorePrimitiveMethodTakingDelegate(kilos, asyncOp, some-delegate-constructed-from-MyCompletionMethod);
12.     }
13.     public event CalculatePriceCompletedEventHandler CalculatePriceCompleted;
14.     protected void OnCalculatePriceCompleted(CalculatePriceCompletedEventArgs e)
15.     {
16.         if(CalculatePriceCompleted != null)
17.         {
18.             CalculatePriceCompleted(this, e);
19.         }
20.     }
21.     private void MyCompletionMethod(AsyncOperation asyncOp)
22.     {
23.         decimal price = ...;
24.         Exception exception = ...;
25.         bool cancelled = ...;
26.         CalculatePriceCompletedEventArgs e = new CalculatePriceCompletedEventArgs(price, exception, cancelled, asyncOp.UserSuppliedToken);
27.         asyncOp.OperationCompleted(onCompletedDelegate, e);
28.     }
29.     private void CalculateCompleted(AsyncOperation asyncOp, object operationState)
30.     {
31.         OnCalculatePriceCompleted((CalculatePriceCompletedEventArgs) operationState);
32.     }
33.     private AsyncOperationPostDelegate onCompletedDelegate;
34. }
35. public class CalculatePriceCompletedEventArgs : AsyncCompletedEventArgs
36. {
37.     public CalculatePriceCompletedEventArgs(decimal price, Exception e, bool cancelled, object state): base(e, cancelled, state)
38.     {
39.         this.price = price;
40.     }
41.     public decimal Price
42.     {
43.         get
44.         {
45.             RaiseExceptionIfNecessary( );
46.             return price;
47.         }
48.     }
49. }
50. public delegate void CalculatePriceCompleteEventHandler(object sender, CalculatePriceCompleteEventArgs e);
```

This component will work in any application framework. AsyncOperationManager and AsyncOperation represent the abstraction points where application frameworks live below and components live above, and the underlying infrastructure insures that the application framework appropriate objects are installed at the right time.

Lines 2 through 34 define the WholesaleGeoduckPricer component written in C#, a Microsoft NET language. This and all other code examples are written in C#. Line 2 is the title line of the component and defines the component as a public class. Lines 4 through 7 define a public Wholesale-GeoduckPricer constructor. Line 6 builds the delegates used to return the asynchronous operation upon completion.

Lines 8 through 12 define a public method CalculatePriceAsync into which the number of kilograms of desired Geoduck wanted for pricing. Also user state is passed into the method. This user state is used to distinguish multiple independent invocations of CalculatePriceAsync. Line 10 creates, but does not yet start, the asynchronous operation by calling the AsyncOperationManager.CreateOperation method to create an AsyncOperation, representing the "lifetime" for this asynchronous operation. The user state is passed into the CreateOperation. This "lifetime" AsyncOperation gets passed around to the underlying mechanism that runs asynchronously. That mechanism also receives a delegate for the MyCompletionMethod( ) method to invoke when the AsynchOperation is done. Eventually, due to success, failure, or cancellation, MyCompletionMethod( ) is invoked on an arbitrary thread, and has the lifetime passed into it.

This MyCompletionMethod builds up the CalculatePrice-CompletedEventArgs, and then calls OperationCompleted on the AsyncOperation, passing in the delegate of the method to be run on the correct thread/context for the current application model. This method is CalculateCompleted( ).

The AsyncOperation.OperationCompleted( ) function does two things: it ensures the specified callback function (delegate) is called in the appropriate threading or concurrency context, and it effectively "ends" the lifetime of the asynchronous operations. Attempts to use the AsyncOperation after calling OperationCompleted will raise an exception. When the above results in CalculateCompleted( ), we're on the right thread/context, and we can just raise our event from there.

Note that multiple outstanding synchronous operations can be supported here because the AsyncOperation is carried around with the calls, rather than stored as single instance data in the component. An alternative to passing the information around would be to maintain a collection of lifetimes on this component, and retrieve them to call OperationCompleted( ), removing them from the collection immediately afterwards.

These drive a design whereby the component asks a static method, AsyncOperationManager.CreateOperation( ) to create a new AsyncOperation for it, and the necessary methods for communication hang off that object. Meanwhile, CreateOperation( ) creates its object by calling through a registered factory whose job is to create a new "lifetime" for the current app model of that thread.

The following illustrates the publicly available interface (methods and properties) for the asynchronous operations manager 203 in which line numbering is added for clarity as follows:

```
1. namespace System.ComponentModel
2. {
3.     public class AsyncOperationManager
4.     {
5.         static AsyncOperation CreateOperation(object
               userSuppliedToken);
6.         static AsyncOperationFactory CurrentFactory
```

-continued

```
7.         {
8.             get;
9.             set;
10.        }
11.        static AsyncOperationFactory FreeThreadedFactory
12.        {
13.            get;
14.        }
15.    }
16. }
```

The method CreateOperation is defined as follows:

static AsyncOperation CreateOperation(object userSuppliedToken);

The method CurrentFactory is defined as follows:

```
1. static AsyncOperationFactory CurrentFactory
2. {
3.     get;
4.     set;
5. }
```

The get and set methods affect the current AsyncOperationFactory for the thread. This factory is used to create the actual AsyncOperation. Only application framework providers call these methods.

The following defines the FreeThreadedFactory method, which is a factory that creates AsyncOperations that always runs on a separate thread:

```
1. static AsyncOperationFactory FreeThreadedFactory
2. {
3.     get;
4. }
```

This method accesses the factory for creating free-threaded asynchronous operation lifetimes.

The following is the class definition for the AsyncOperation made reference to in the above code examples (line numbering added for clarity):

```
1   public abstract class AsyncOperation
2.  {
3.      public AsyncOperation(object userSuppliedToken);
4.      public object UserSuppliedToken { get; }
5.      public void OperationCompleted(AsyncOperationPostDelegate d,
            object arg);
6.      public void Post(AsyncOperationPostDelegate d, object arg);
7.      protected abstract void OperationCompletedCore(AsyncOperationPostDelegate d,
            object arg);
8.      protected abstract void Post(AsyncOperationPostDelegate d,
            object arg);
9.  }
```

The following VB.NET code demonstrates a "usage" of this pattern. The first line constructs a new WholesaleGeoduckPricer component. The second line begins a CalculatePrice operation, called CalculatePriceAsync because it's proceeding asynchronously. Finally, the function at the end is the "completion handler" that, upon completion of the pricing operation, invokes this function with the function's result. Note that this completion function gets called asynchronously, and is called on the correct thread/context for which the application is running (line numbering added for clarity).

```
1. WithEvents MyPricer as New WholesaleGeoduckPricer
2. MyPricer.CalculatePriceAsync(3.4, Nothing)
3. Sub Pricer_CalculatePriceCompleted(ByVal Sender as Object,
    ByVal e as CalculatePriceEventArgs)
4.     Handles MyPricer.CalculatePriceCompleted
5.     MessageBox.Show("Price is" + e.Price);
6. End Sub
```

Accordingly, a programming model has been described in which components may be built in a manner that is independent of the underlying application framework used to build the application into which the component is incorporated. Accordingly, the principles of the present invention allow for the more efficient progress of software advancement when building components that implementing asynchronous operations since the component author need not expressly address the potential underlying application framework threading and concurrency models in the component itself.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A computer program product for use in a computing system that includes one or more processors, the computer program product including one or more recordable-type computer-readable storage media having thereon computer-executable instructions that, when executed by the one or more processors, cause the computing system to instantiate the following:

an application built in accordance with a particular application framework;

at least, one component, the component being enabled to be incorporated into the application by a function call, the component being enabled to place a standard function call to initiate an asynchronous operation, the component being enabled to call a method of an asynchronous operations manager to create an asynchronous operation, wherein when an asynchronous operation is to be performed, the component issues a standard function call which is independent of the particular application framework used to build the application;

an application framework module that is configured to notify the asynchronous operations manager that the particular application framework is the application framework used to build the application into which the component is incorporated; and an asynchronous operations manager comprising a standard interface, the standard interface comprising a public method which is called to create an asynchronous operation which comprises a public method which is to be called upon completion of the asynchronous operation, the asynchronous operations manager being configured to detect the particular application framework used to build the application, receive the standard function call, perform the asynchronous operation, and, upon completion of the asynchronous operation, cause a notification to be issued to the component in a manner that is in accordance with the threading or concurrency model of the application framework, the asynchronous operations manager being further configured to issue the notification on a thread or in a concurrency context that is appropriate for the particular application framework.

2. A computing system comprising one or more processors, system memory, and upon which is instantiated and executed instructions stored in the one or more recordable-type computer-readable storage media of the computer program product of claim 1.

3. In a computing system capable of executing applications that are built using an application framework, the application incorporating one or more components and the components being enabled to issue function calls to initiate asynchronous operations, a method for performing asynchronous operations in a manner independent of the application framework used to build the application into which the component is incorporated, the method comprising:

an act of receiving a standard function call from a component, the component being enabled to call a method of an asynchronous operations manager to create an asynchronous operation, the standard function call being issued in a manner independent of the application framework used to build the application into which the component is incorporated;

an act of an asynchronous operations manager detecting the application framework used to build the application into which the component is incorporated, the asynchronous operations manager comprising a public method which is called to create an asynchronous operation, and wherein the act of detecting includes an act of receiving a notification indication from an application framework module that is specific to the application framework;

an act of determining that an asynchronous operation is to be performed in response to the function call;

an act of performing the asynchronous operation in accordance with a threading or concurrency model of the application framework used to build the application into which the component is incorporated; and upon completion of the asynchronous operation, an act of asynchronous operations manager issuing a notification to the component in a manner in accordance with the threading or concurrency model and by issuing the notification on a thread that is appropriate for the detected application framework.

4. A method in accordance with claim 3, wherein the act of issuing the notification on a thread that is appropriate for the detected application framework comprises the following:

an act of issuing the notification on any thread.

5. A method in accordance with claim 3, wherein the act of issuing the notification on a thread that is appropriate for the detected application framework comprises the following:
an act of issuing the notification on a thread that is being used to render a user interface.

6. A method in accordance with claim 3, wherein the act of issuing the notification on a thread that is appropriate for the detected application framework comprises the following:
an act of issuing the notification on a thread that is not being used to render a user interface.

7. A method in accordance with claim 3, wherein the act of issuing the notification on a thread that is appropriate for the detected application framework comprises the following:
an act of issuing the notification on a thread that is the same as the thread used to issue the standard function call.

8. A method in accordance with claim 3, wherein the act of issuing the notification on a thread that is appropriate for the detected application framework comprises the following:
an act of issuing the notification on any thread provided the operations are serialized in that there are no two threads active at once running code from the application.

9. A method in accordance with claim 3, wherein the act of determining that an asynchronous operation is to be performed comprising the following:
an act of detecting that a plurality of asynchronous operations are to be performed in response to one or more function calls; the method further comprising the following:
an act of accounting for the plurality of asynchronous operations such that application execution continues after all of the plurality of asynchronous operations are complete.

10. A method in accordance with claim 3, wherein the act of performing the asynchronous operation to be performed in accordance with a threading and concurrency model of the application framework used to build the application into which the component is incorporated, comprises the following:
an act of running one or more threads that reduce the work of the computing system; and
after the act of running one or more threads that reduce the work of the computing system, an act of running one or more threads that increase the work of the computing system.

11. A computer program product for use in a computing system capable of executing applications that are built using an application framework, the application incorporating one or more components, the computer program product for implementing a method for at least one of the components performing asynchronous operations in a manner that is independent of the application framework used to build the application into which the component is incorporated, the computer program product comprising one or more recordable-type computer-readable storage media having thereon computer-executable instructions that, when executed by one or more processor of the computing system, cause the computing system to perform the method of claim 3.

12. A computer program product in accordance with claim 11, wherein the computer-executable instructions for issuing the notification on a thread that is appropriate for the detected application framework comprise computer-executable instructions that, when executed by the one or more processors, cause the computing system to perform the following:
an act of issuing the notification on any thread.

13. A computer program product in accordance with claim 11, wherein the computer-executable instructions for issuing the notification on a thread that is appropriate for the detected application framework comprise computer-executable instructions that, when executed by the one or more processors, cause the computing system to perform the following:
an act of issuing the notification on a thread that is being used to render a user interface.

14. A computer program product in accordance with claim 11, wherein the computer-executable instructions for issuing the notification on a thread that is appropriate for the detected application framework comprise computer-executable instructions that, when executed by the one or more processors, cause the computing system to perform the following:
an act of issuing the notification on a thread that is not being used to render a user interface.

15. A computer program product in accordance with claim 11, wherein the computer-executable instructions for issuing the notification on a thread that is appropriate for the detected application framework comprise computer-executable instructions that, when executed by the one or more processors, cause the computing system to perform the following:
an act of issuing the notification on a thread that the same as the thread used to issue the standard function call.

16. In a computing system capable of executing applications that are built using an application framework, the application incorporating at least one component, a method for the component performing an asynchronous operation in a manner that is independent of the application framework used to build the application, the method comprising:
an act of receiving a standard function call from the component, the standard function call being issued in a manner independent of the application framework used to build the application into which the component is incorporated;
an asynchronous operations manager receiving a call to a public method to create an asynchronous operation, the asynchronous operation comprising a public method which is to be called upon completion of the asynchronous operation; and
a step for performing an asynchronous operation in a manner appropriate for the application framework in response to the standard function call, even though the standard function call was issued in a manner that is independent of the application framework, wherein said step for performing the asynchronous operation includes:
an act of detecting the application framework used to build the application into which the component is incorporated by at least receiving a notification indication the application framework from an application framework module that is specific to the application framework;
an act of determining that an asynchronous operation is to be performed in response to the function call;
an act of performing the asynchronous operation to be performed in accordance with a threading or concurrency model of the application framework used to build the application into which the component is incorporated; and an act of issuing a notification to the component in a manner that is in accordance with the threading or concurrency model when the asynchronous operation is complete and by issuing the notification on a thread that is appropriate for the detected application framework.

17. A method in accordance with claim 16, wherein the act of issuing the notification on a thread that is appropriate for the detected application framework comprises the following:

an act of issuing the notification on any thread.

18. A method in accordance with claim 16, wherein the act of issuing the notification on a thread that is appropriate for the detected application framework comprises the following:

an act of issuing the notification on a thread that is being used to render a user interface.

19. A method in accordance with claim 16, wherein the act of issuing the notification on a thread that is appropriate for the detected application framework comprises the following:

an act of issuing the notification on a thread that is not being used to render a user interface.

20. A method in accordance with claim 16, wherein the act of issuing the notification on a thread that is appropriate for the detected application framework comprises the following:

an act of issuing the notification on a thread that the same as the thread used to issue the standard function call.

* * * * *